United States Patent Office 2,787,591
Patented Apr. 2, 1957

2,787,591

ELECTROLYTIC METHOD OF DEPOSITING ALKALI METAL AT A MERCURY CATHODE

William C. Gardiner, Niagara Falls, and Joseph L. Wood, Lewiston, N. Y., assignors to Olin Mathieson Chemical Corporation, a corporation of Virginia No Drawing. Application June 23, 1949,
Serial No. 100,956

5 Claims. (Cl. 204—125)

This invention relates to the electrolyzing of alkali metal halide brines in which the impurities iron and magnesium are kept at minimum values and a certain concentration of calcium ions is maintained in solution, and has for its object a control over the acidity of the brine to improve the efficiency of the electrolysis.

We have previously discovered that the hydrogen deposited is practically eliminated if the iron and magnesium be kept below 0.0001 and 0.006 gram per liter respectively. We maintain in the brine calcium ions in substantial proportions varying from 0.8 to 1.45 grams $Ca^{++}$ per liter, advantageously provided by $CaSO_4$ in which case the brine contains from 2.5 to 3.5 grams $SO_4^=$ per liter. We have now found that brines containing such amounts of $CaSO_4$ can be more efficiently utilized for mercury cell electrolysis if the pH is controlled within critical limits. The pH of the brine may be measured at any convenient place so long as it indicate or be interpreted to measure the pH in the cell brine. For example, the pH may be measured on the inlet brine, in the cell, or on a sample of the outlet brine, as by means of a glass electrode. When the pH is measured on the inlet brine, a pH of from 1.7 to 3.5 is an effective range. This gives a pH range of from 1.7–3.0 in the cell. The pH should not fall below about 1.5 in the cell, at which point hydrogen ions discharge on the mercury and form gas. The calcium concentration mentioned is maintained so that $SO_4^=$ will not dissolve beyond the value satisfying the solubility product for $CaSO_4$ but if the $Ca^{++}$ ions do not exceed 0.7 gram per liter in a conventional sodium chloride brine at room temperature, pH control of the brine is not necessary.

In its more complete aspects, our invention is concerned with the electrolyzing of alkali metal halide brines involving the deposition of the alkali metal at the mercury cathode in an electrolytic cell wherein brine leaving the cell is dechlorinated, resaturated, made alkaline, freed from precipitated material and returned to the cell, and provides the improvement in which the pH of the brine in the cell is maintained at from 1.7 to 3.0 when the brine is practically saturated with $CaSO_4$, containing from 0.8 to 1.45 grams per liter of $Ca^{++}$ ions, whereby the deposition of hydrogen is effectively suppressed. It is convenient to maintain the brine in the cell at a pH of from 1.7–3.0 by maintaining the inlet brine at a pH of from 1.7–3.5.

The iron and magnesium may advantageously be kept at low minimums by the method described in the patent of Maurice C. Taylor and William C. Gardiner No. 2,248,137. The brine tends to become alkaline due to the caustic soda which is formed as an accessory to the hydrogen discharge. The brine tends to become acid due to the hydrolysis of chlorine; the acid from this source is greater when the percent saturation of the brine with chlorine is high, or when there is little direct action. Another source of acid within the cell is the decomposition of HOCl to HCl and oxygen; however, this action appears to be small. Ordinarily only a small amount of hydrochloric acid will have to be added to the brine continuously to keep it in the pH range 1.7 to 3.0 in the cell. The hydrogen discharge in the outlet end box of stationary cells contributes to their inefficiency. Minimum discharge in the end box is important not only on account of its effect on efficiency but on the HCl requirement for dechlorination.

In carrying out a method of the invention, we control the acidity of the brine by the addition at any suitable place of an amount of hydrochloric acid necessary to obtain the desired pH in the cell. The pH may be measured by a glass electrode indicator placed, for example, in a sample of the outlet brine. The outlet brine is a desirable point of control where several cells are operated on a common inlet brine. The indicator actuates an automatically controlled hydrochloric acid feed which introduces hydrochloric acid into the inlet brine or, if necessary, into the brine at various points in the cell. Since it is difficult to make the glass electrode operate in the cell, it might be necessary to withdraw brine from the cell at some proper point and have it continuously flowing through a chamber in which the glass electrode is inserted. No attempt need be made to remove calcium or sulfate from the brine. It will come up to its saturation value and remain there.

When calcium ions are present in the brine to the extent of 0.8 to 1.45 grams per liter and the pH is above about 3, hydrogen formation is increased. When the calcium ion concentration is less than about 0.8 gram per liter, however, the pH may be above 3 without significant increase in hydrogen production. We believe the hydrogen formation may be due to calcium discharge on the amalgam. The activity of calcium ions may be affected by the degree of acidity, and particularly when they are on the verge of discharge, a small increase in pH may cause their discharge and subsequent evolution of hydrogen. Hydrogen discharge appears also to be related to the concentration of hypochlorous acid in the brine. However, we believe that this is due only indirectly to the hypochlorous acid which raises the pH by reacting with and decreasing the concentration of HCl, converting it into chlorine and water. In the presence of calcium ions, this reduction in acidity leads to calcium discharge and hydrogen formation.

If the pH in the cell is lowered to below about 1.5, hydrogen discharge will be obtained due to the acidity of the brine; i. e. hydrogen ions simply discharge on the surface of the mercury and form gas. The point at which this occurs is around pH 1.7 and forms the lower limit of brine cell operation.

The effect of pH of the brine on the $H_2$ in $Cl_2$ in the presence of different $CaSO_4$ concentrations is shown in the following tables:

Table I

| Test No. | $Ca^{++}$ Conc., g. p. l. | $SO_4^=$ Conc., g. p. l. | Inlet, pH | $H_2$ in $Cl_2$, percent |
|---|---|---|---|---|
| 1 | 1.12 | 2.55 | 1.5 | 0.39 |
| 2 | 1.12 | 2.55 | 3.4 | 0.55 |
| 3 | 1.12 | 2.55 | 4.8 | 0.82 |
| 4 | 1.12 | 2.55 | 6.0 | 1.90 |
| 5 | 1.12 | 2.55 | 7.7 | 2.4 |

These tests show that a pH of 1.5 is too low because the hydrogen was 0.9%. With a pH of 3.4 the operation was satisfactory with only 0.55% hydrogen, but at a pH of 4.8 or higher, the hydrogen was too high. Preferably the hydrogen in the chlorine should not amount to more than 0.75%.

Table II

| Test No. | Ca++ Conc., g. p. l. | SO4=Conc., g. p. l. | Inlet, pH | H2 in Cl2, percent |
|---|---|---|---|---|
| 6 | 1.04 | 1.64 | 1.6 | 0.60 |
| 7 | 1.04 | 1.64 | 3.3 | 0.63 |
| 8 | 1.04 | 1.64 | 5.3 | 0.95 |
| 9 | 1.04 | 1.04 | 6.8 | 1.14 |

The low hydrogen in test No. 6 was surprising since the pH of the inlet brine was 1.6. However, in the cell, the pH of the brine was probably over 1.7. At pH 3.3 the operation was satisfactory, but when the pH was 5.3 and 6.8, the hydrogen content was too high at 0.95% and 1.14% respectively.

Table III

| Test No. | Ca++ Conc., g. p. l. | SO4=Conc., g. p. l. | Inlet, pH | H2 in Cl2, percent |
|---|---|---|---|---|
| 10 | 1.11 | 2.62 | 3.4 | 0.90 |
| 11 | 1.11 | 2.02 | 4.9 | 1.20 |
| 12 | 1.11 | 2.62 | 6.5 | 2.9 |

Test No. 10 was near the limit of pH 3.5 of the inlet brine, and the hydrogen in the chlorine was slightly above the most satisfactory operation. Tests 11 and 12 were definitely too high in pH and hydrogen.

Table IV

| Test No. | Ca++ Conc., g. p. l. | SO4=Conc., g. p. l. | Inlet, pH | H2 in Cl2, percent |
|---|---|---|---|---|
| 13 | 0.58 | 2.08 | 3.6 | 0.35 |
| 14 | 0.58 | 2.08 | 5.2 | 0.32 |
| 15 | 0.58 | 2.08 | 6.9 | 0.60 |
| 16 | 0.58 | 2.08 | 8.2 | 0.76 |
| 17 | 0.58 | 2.08 | 9.5 | 0.70 |
| 18 | 0.38 | 3.20 | 4.0 | 0.30 |
| 19 | 0.38 | 3.20 | 5.0 | 0.32 |
| 20 | 0.38 | 3.20 | 6.9 | 0.41 |
| 21 | 0.38 | 3.20 | 6.9 | 0.47 |
| 22 | 0.38 | 3.20 | 8.2 | 0.40 |
| 23 | 0.38 | 3.20 | 9.8 | 0.35 |

In these tests the calcium concentrations were below our preferred limits and show that pH control is unnecessary, and the hydrogen is satisfactorily low even at high values of pH.

Table V

| Test No. | Ca++ Conc., g. p. l. | SO4=Conc., g. p. l. | Inlet, pH | H2 in Cl2, Percent | pH in Cell |
|---|---|---|---|---|---|
| 24 | 0.58 | 2.33 | 3.4 | 0.35 | 2.5-2.1 |
| 25 | 0.65 | 2.40 | 3.5 | 0.41 | 2.6-2.1 |
| 26 | 0.75 | 2.80 | 6.8 | 0.72 | 2.7-2.6 |
| 27 | 0.79 | 2.80 | 6.8 | 0.72 | 2.8-2.4 |
| 28 | 0.78 | 2.73 | 10.4 | 0.70 | 3.0-2.5 |
| 29 | 0.80 | 2.80 | 11.2 | 0.89 | 3.3-2.9 |
| 30 | 1.32 | 1.75 | 3.5 | 0.44 | 2.5-2.2 |
| 31 | 1.30 | 1.84 | 4.4 | 0.38 | 2.7-2.3 |
| 32 | 1.08 | 2.18 | 5.4 | 1.80 | 3.0-3.6 |
| 33 | 1.07 | 2.33 | 6.3 | 2.00 | 2.8-4.1 |
| 34 | 0.98 | 2.26 | 8.3 | 2.01 | 3.0-3.9 |
| 35 | 0.97 | 2.26 | 10.2 | 3.00 | 5.3-5.4 |

In these tests the pH in the cell was also measured. When that pH was below 3 as in tests 24–28 and 30–31, the hydrogen was below 0.75. However, in test No. 29 the pH went slightly above our limit, and the hydrogen content slightly above preferred operation. Tests 32–35 show that the pH was too high because the hydrogen content was excessive.

Table VI

| Test No. | Ca++ Conc., g. p. l. | Inlet, pH | pH in Cell | H2 in Cl2, percent |
|---|---|---|---|---|
| 36 | 1.00 | 1.98 | 1.93 | 0.55 |
| 37 | .98 | 1.90 | 2.02 | .77 |
| 38 | 1.01 | 3.00 | 2.22 | .25 |
| 39 | 1.01 | 3.35 | 2.26 | .31 |
| 40 | 1.04 | 3.45 | 2.26 | 0.44 |

These examples show our preferred operation with calcium, about 1 gram per liter, inlet pH below 3.5, cell pH below 3 and hydrogen below about 0.75%.

We claim:

1. In the deposition of an alkali metal at the mercury cathode in an electrolytic cell wherein an alkali metal chloride brine practically saturated with calcium sulfate, containing from 0.8 to 1.45 grams per liter of Ca++ ions, is employed and wherein brine leaving the cell is dechlorinated, resaturated, made alkaline and freed from precipitated material for return to the cell, the improvement which comprises maintaining the pH of the brine in the cell at from 1.7 to 3.0 whereby the deposition of hydrogen is effectively suppressed.

2. In the deposition of an alkali metal at the mercury cathode in an electrolytic cell wherein an alkali metal chloride brine practically saturated with calcium sulfate, containing from 0.8 to 1.45 grams per liter of Ca++ ions, is employed and wherein brine leaving the cell is dechlorinated, resaturated, made alkaline and freed from precipitated material for return to the cell, the improvement which comprises maintaining a pH in the cell to effectively suppress the deposition of hydrogen by adjusting the pH of the inlet brine at from 1.7 to 3.5.

3. In the electrolysis in mercury cells of alkali metal chloride brines substantially saturated with CaSO4 but containing at least 0.8 gram per liter of Ca++ ions and wherein brine leaving the cell is dechlorinated, resaturated, made alkaline and freed from precipitated material for return to the cell, the improvement which comprises maintaining the pH of the brine in the cell above the point where hydrogen discharges on the mercury and forms gas, the pH of the brine in the cell being from 1.7 to 3.0.

4. In the electrolysis in mercury cells of alkali metal chloride brines substantially saturated with CaSO4 but containing at least 0.8 gram per liter of Ca++ ions and wherein brine leaving the cell is dechlorinated, resaturated, made alkaline and freed from precipitated material for return to the cell, the improvement which comprises maintaining the pH of the brine in the cell above the point where hydrogen discharges on the mercury and forms gas by maintaining the pH of the inlet brine at from 1.7 to 3.5.

5. In the deposition of an alkali metal at the mercury cathode in an electrolytic cell wherein an alkali metal chloride brine saturated with calcium sulfate and containing approximately 0.8 to 1.2 grams per liter of calcium ion is employed, and wherein brine leaving the cell is dechlorinated, resaturated, made alkaline, and freed from precipitated material for return to the cell, the improvement which comprises maintaining the pH of the brine at the cell inlet from approximately 1.7 to approximately 3.5.

References Cited in the file of this patent

UNITED STATES PATENTS

| 1,003,041 | Ekstrom | Sept. 12, 1911 |
| 2,248,137 | Taylor et al. | July 8, 1941 |

FOREIGN PATENTS

| 506,394 | Great Britain | May 25, 1939 |